US007485086B2

(12) United States Patent
Dickie

(10) Patent No.: US 7,485,086 B2
(45) Date of Patent: Feb. 3, 2009

(54) ROCKING MECHANISM FOR CHILDREN WITH ASSOCIATED SOUNDS

(75) Inventor: Robert G. Dickie, Newmarket (CA)

(73) Assignee: 3699013 Canada Inc., King City, Ontario ( * ) Notice: Subject to any disclaimer, the term of this patent is extended or adjusted under 35 U.S.C. 154(b) by 170 days.

(21) Appl. No.: 11/291,885

(22) Filed: Dec. 1, 2005

(65) Prior Publication Data

US 2007/0129596 A1 Jun. 7, 2007

(51) Int. Cl.
*A61M 21/00* (2006.01)
(52) U.S. Cl. ........................................... 600/28
(58) Field of Classification Search ............. 600/26–28; 5/101, 107–109, 904, 105; 180/166
See application file for complete search history.

(56) References Cited

U.S. PATENT DOCUMENTS

| 4,141,095 A | 2/1979 | Adachi |
| 4,656,680 A | 4/1987 | Wilson |
| 4,793,010 A | 12/1988 | Gross et al. |
| 4,891,852 A | 1/1990 | Lopez, Jr. |
| 4,934,997 A | 6/1990 | Skakas |
| 4,985,949 A | 1/1991 | Jantz |
| 5,016,301 A | 5/1991 | Combs |
| 5,063,912 A | 11/1991 | Hughes |
| 5,088,138 A | 2/1992 | Munster |
| 5,099,528 A | 3/1992 | Wadman |
| 5,183,457 A * | 2/1993 | Gatts et al. .................... 600/21 |
| 5,398,353 A | 3/1995 | Sachathamakul |
| 5,588,164 A | 12/1996 | Proulx |
| 5,711,045 A | 1/1998 | Caster et al. |
| 5,806,113 A | 9/1998 | McMahan et al. |
| 5,860,698 A | 1/1999 | Asenstorfer et al. |
| 2002/0113469 A1 | 8/2002 | Stern et al. |
| 2005/0189796 A1 | 9/2005 | Gregorian |

FOREIGN PATENT DOCUMENTS

| CA | 2022866 | 3/1991 |
| DE | 10104009 | 11/2002 |
| EP | 1716792 | 11/2006 |
| JP | 3258214 | 11/1991 |

OTHER PUBLICATIONS www.sleeptightinfantsoother.com, SleepTight® Infant Soother—6pages—document is undated but inventor believes the document is prior art, Nov. 2003.

* cited by examiner

*Primary Examiner*—Charles A Marmor, II
*Assistant Examiner*—Christine D Hopkins
(74) *Attorney, Agent, or Firm*—Sand & Sebolt

(57) ABSTRACT

An infant rocking assembly includes a base, a sound-producing device for playing a soundtrack to produce a sound pattern, a top member which is movably mounted on the base and supports an infant-supporting structure such as a carrier seat or stroller, and a motor for moving the top member relative to the base in a manner which is synchronized with the sound pattern. Preferably, a stepper motor is used to produce complex movements of the top member and facilitate the synchronization. The stepper motor preferably rolls a truck between the base and top member to move the top member via engagement between upper rollers of the truck and camming surfaces of the top member. A microprocessor controls the motor and sound-producing device. A mattress support member and the low-profile rocking assembly may be positioned below an infant mattress to rock the infant mattress.

35 Claims, 9 Drawing Sheets

ROCKING MECHANISM FOR CHILDREN WITH ASSOCIATED SOUNDS

BACKGROUND OF THE INVENTION

1. Technical Field

The invention relates generally to a rocking assembly for use with cradles, cribs, carrier seats or similar infant or child support structures. More particularly, the invention relates to such a rocking assembly which is used in combination with a sound producing device for producing music or other sounds appropriate to facilitate the calming and/or sleeping of an infant or child. Specifically, the invention relates to such a rocking assembly which is capable of producing complex movements which are synchronized with the music or other associated sounds.

2. Background Information

Rocking assemblies for use with infants and small children are well-known in the art and some of them include sound producing devices which may produce music, white noise or various sounds that are intended to simulate the sounds heard by a fetus when in the mother's womb. A variety of rocking mechanisms are known in the art which are driven by electric motors. Several of these rocking mechanisms utilize a rotating wheel with a translating rod attached thereto whereby rotational movement of the wheel is translated to a vertical up and down motion of the translating rod in order to move a portion of the infant support structure to produce a rocking movement thereof. For example, such rocking mechanisms are disclosed in U.S. Pat. No. 4,141,095 granted to Adachi, U.S. Pat. No. 4,985,949 granted to Jantz and U.S. Pat. No. 5,806,113 granted to McMahan et al. The latter patents include a motion detector to sense movement of a small child within a cradle such that the child's movement activates a tape player to play for a predetermined period of time.

In addition, rocking mechanisms are known which utilize rotating cams in order to produce a rocking movement. For example, U.S. Pat. No. 4,656,680 granted to Wilson discloses upper and lower members pivotally connected to one another with a rotating cam mounted on the base for pivoting the upper member in an oscillating manner to produce the rocking movement. U.S. Pat. No. 5,711,045 granted to Caster et al. also uses rotating elliptical cams to produce a rocking movement. In particular, Caster et al. utilize three cams for respectively pivoting an upper member about three axes. Neither of these patents utilizes a sound producing device.

U.S. Pat. No. 5,088,138 granted to Munster discloses a baby crib with a bed frame assembly supported on a base platform by flexible straps to produce a swinging apparatus driven by a rotating member via tension springs connected thereto. Munster does not disclose a sound producing device. In addition, U.S. Pat. No. 5,398,353 granted to Sachathamakul teaches a rocking base pivotally mounted on a semi-hemispherical member wherein a rotating T-bar has weighted members on either end thereof in order to rock the rocking base about the pivot during rotation of the T-bar. This patent mentions the possibility of using a sound producing device, specifically referencing U.S. Pat. No. 5,063,912 granted to Hughes, which discloses a sound producing device for producing womb-like sounds and which is free of any connection to a power source. The Hughes device is configured to fit within an interior chamber of a specially configured mattress for a baby crib.

U.S. Pat. No. 4,793,010 granted to Gross et al. discloses a rocker device for a crib wherein each of the four legs of the crib are received in a rollable holder. Three of the rollable holders are rollable on a non-slip base and the fourth is also rollable on a base and driven back and forth by a motor which translates rotational movement to horizontal movement of the rollable holder. The movement produced by this rocking mechanism is horizontal only. Gross et al. further disclose a tape recorder for playing music or other sounds such as a mother's voice to facilitate pacification of the baby.

U.S. Pat. No. 4,934,997 granted to Skakas discloses a rocking mechanism which includes a top which is moveable with respect to a base and is adapted for receiving thereon a child support structure in the form of a hammock-type configuration. One embodiment involves a base which has arcuate portions on which rollers of the top are rollably seated so that a drive mechanism moving the top in a substantially horizontal direction creates a rocking movement. A second embodiment utilizes a plurality of spring units mounted on a base with the infant support structure mounted atop the spring units whereby movement of the infant creates the rocking movement via the spring units reacting to the movement of the infant. Skakas also discloses a sound producing device for producing a heart beat sound.

Also known in the art is a crib vibrator and sound generator sold under the name SleepTight®. This product comprises two separate units, a vibration unit which mounts on the bottom of the crib below the mattress and a sound generator unit which mounts on the side railing of a crib. The basic concept is to simulate the sound and motion of a car going 55 mph. More particularly, the vibration unit produces the common vibration sound of an operating car engine while the sound generator produces a white noise which simulates the wind sound from a moving car. This product is a crib vibrator as opposed to a rocking mechanism.

Aside from the crib vibrator just discussed, the patents noted above generally teach rocking mechanisms which produce a regular and generally smooth movement. Some of these teach a strict oscillating movement back-and-forth either in a single plane or back-and-forth movement which involves both horizontal and vertical movement more similar to that of a standard rocker. The Caster et al. patent further allows for pivotal movement about three axes while the Sachathamakul provides for multi-directional pivoting about a central pivot on the bottom of a rocking base. However, none of these patents teach a rocking or oscillating movement which can be interrupted in a manner to produce a jerky or bumpy type of movement. Such bumpy or jerky types of movements are well-known with regard to the movement of a vehicle such as a car on a bumpy road or a train moving along a track. In addition, the references noted herein fail to disclose a sound producing device wherein the rocking mechanism and the sound producing device are operated in a synchronized manner. In addition, there is a need in the art for a rocking device which may be easily used with a variety of different infant support structures such as carrier seats, strollers, cribs and the like.

BRIEF SUMMARY OF THE INVENTION

The present invention provides an infant sleep-inducing apparatus comprising a base adapted to sit on a supporting surface; a sound-producing device for playing a soundtrack to produce a sound pattern; a top member which is movably mounted on the base and adapted to support an infant-supporting structure; and a motor for moving the top member relative to the base in a manner which is synchronized with the sound pattern.

The present invention further provides an infant sleep-inducing apparatus comprising a base adapted to sit on a supporting surface; a top member which is movably mounted on the base and adapted to support an infant-supporting structure; and a stepper motor for moving the top member relative to the base.

A preferred embodiment includes a rollable truck which is driven by a motor and imparts rocking movement to a top member adapted to support an infant-supporting structure.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
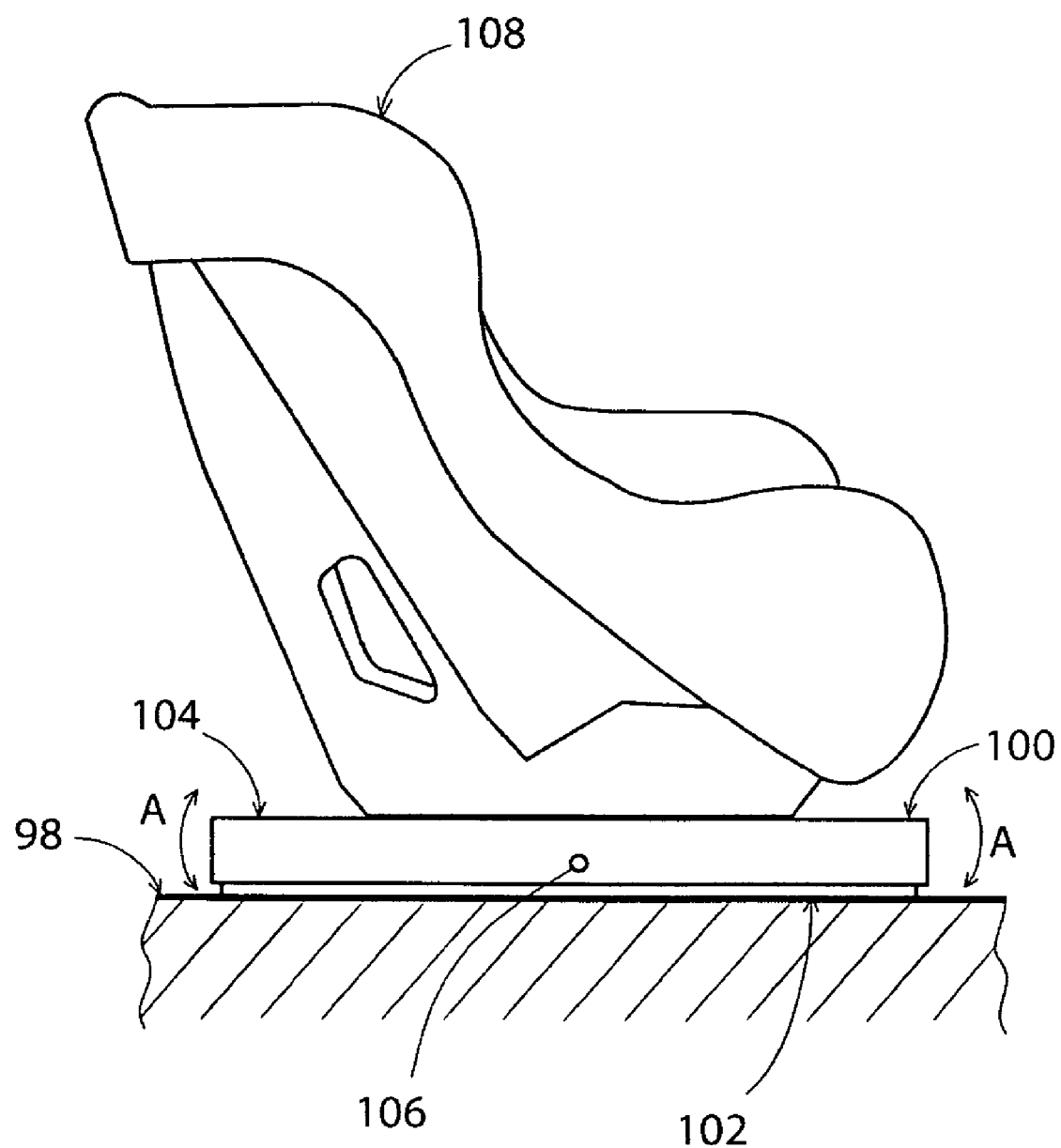
FIG. 1 is a side elevational view of a first embodiment of the rocking assembly of the present invention seated on a supporting surface with a car seat seated atop the rocking assembly.
Figure 2:
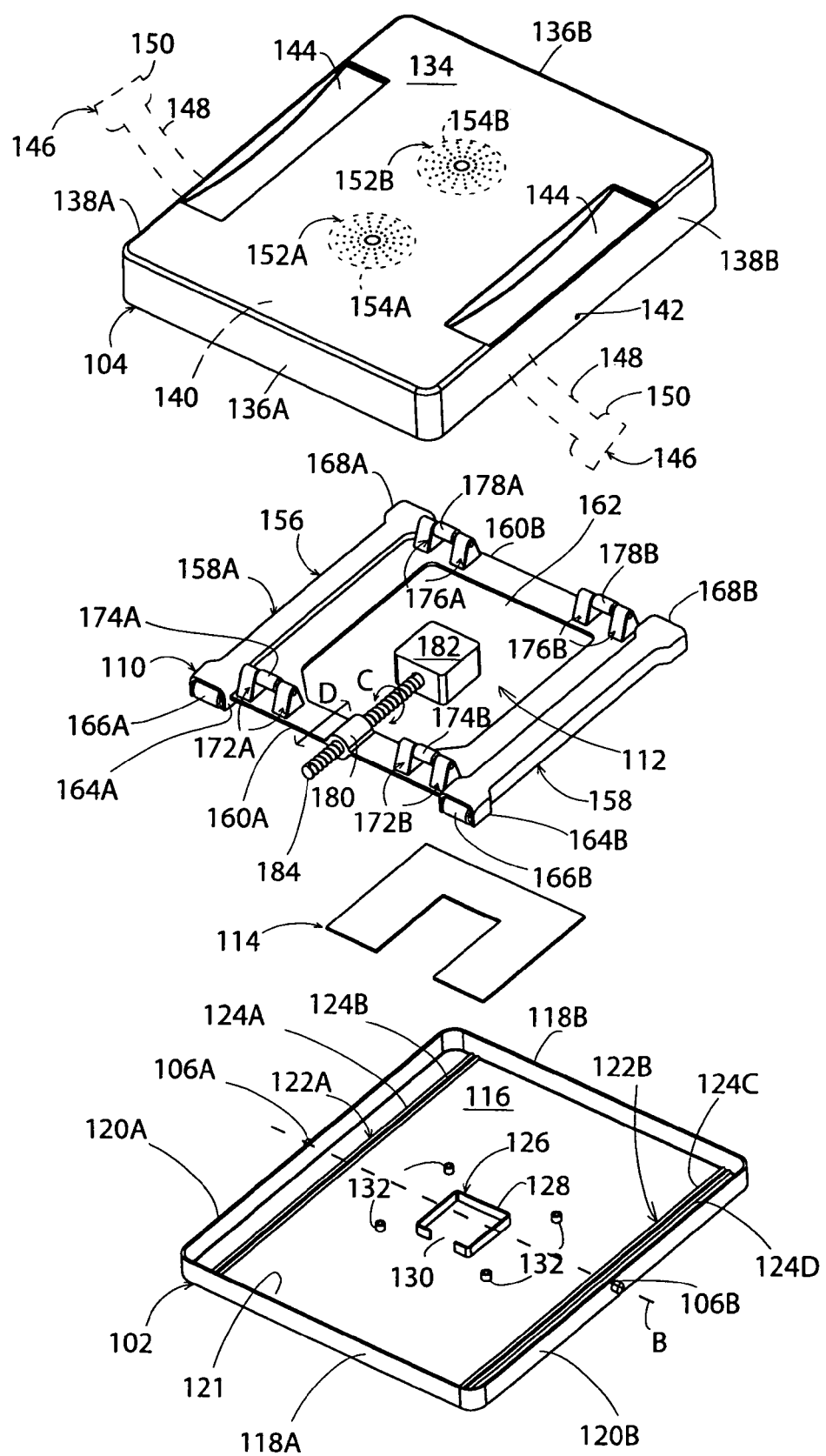
FIG. 2 is an exploded perspective view of the first embodiment.
Figure 11:
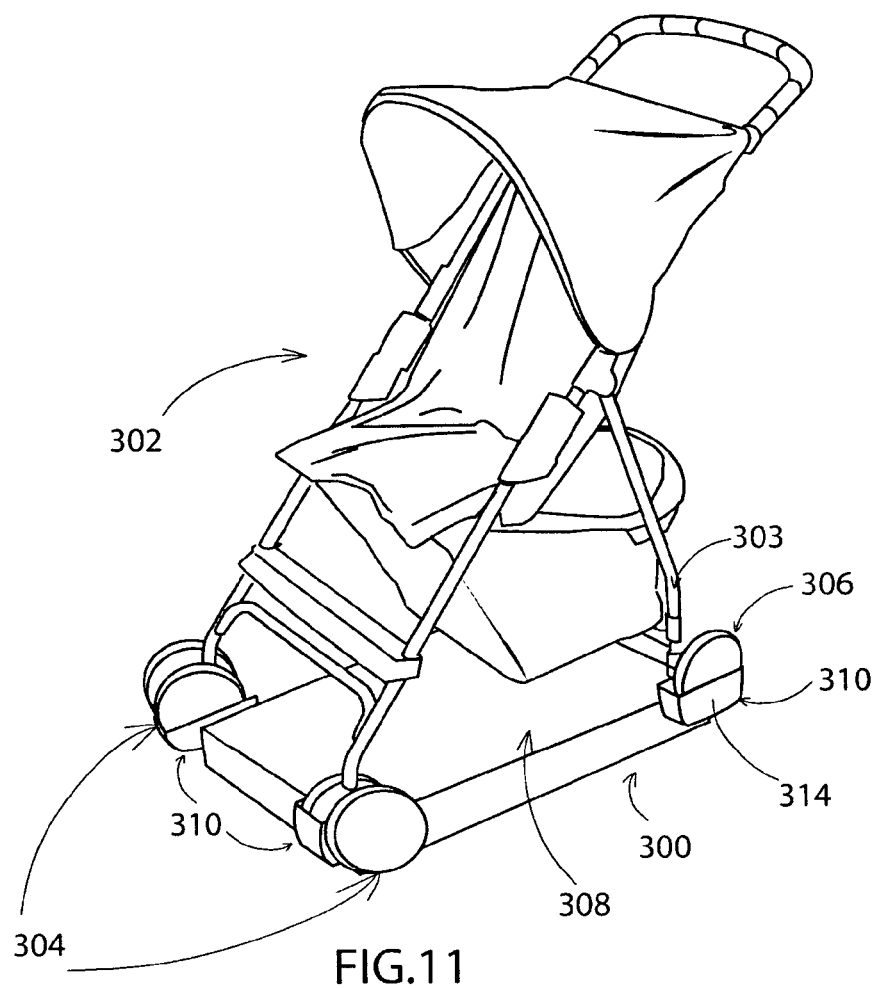
FIG. 11 is a perspective view of a second embodiment of the rocking mechanism of the present invention with a stroller seated thereon.
Figure 12:
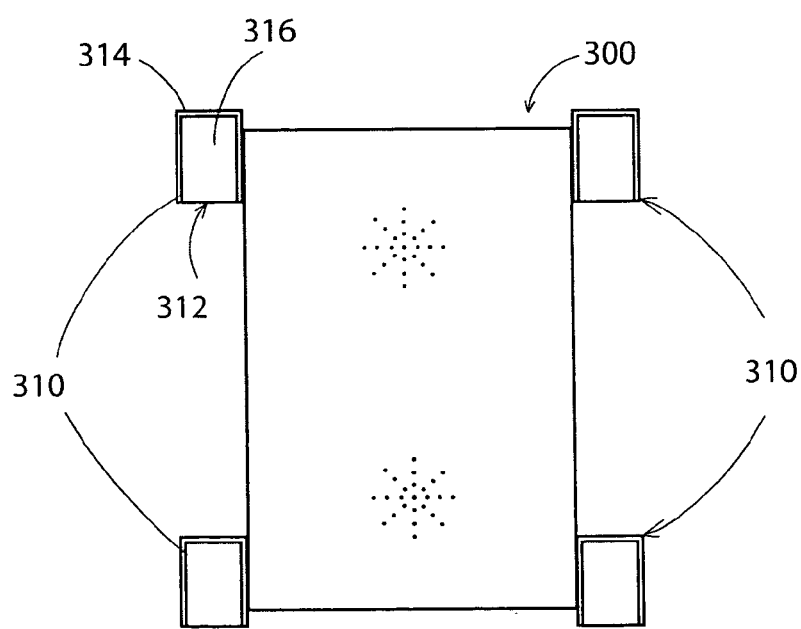
FIG. 12 is a top view of the second embodiment.
Figure 14:
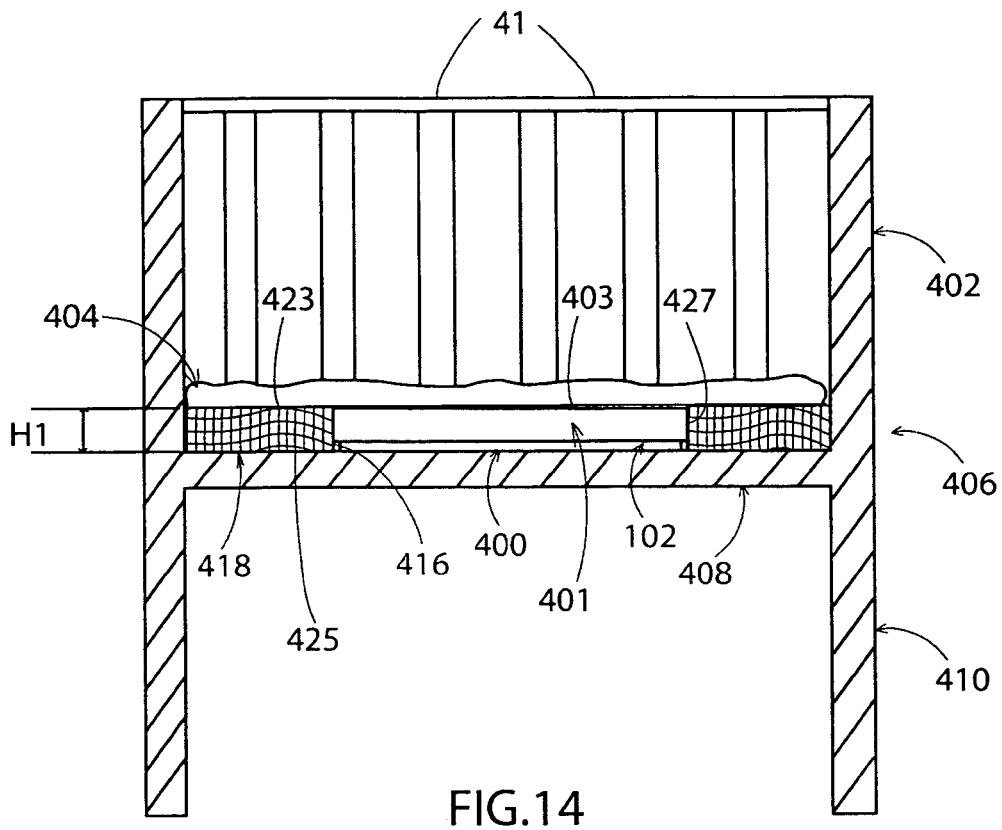
FIG. 14 is a sectional view taken on line 14-14 of FIG. 13 with the mattress in place atop the rocking assembly and peripheral member.
Figure 13:
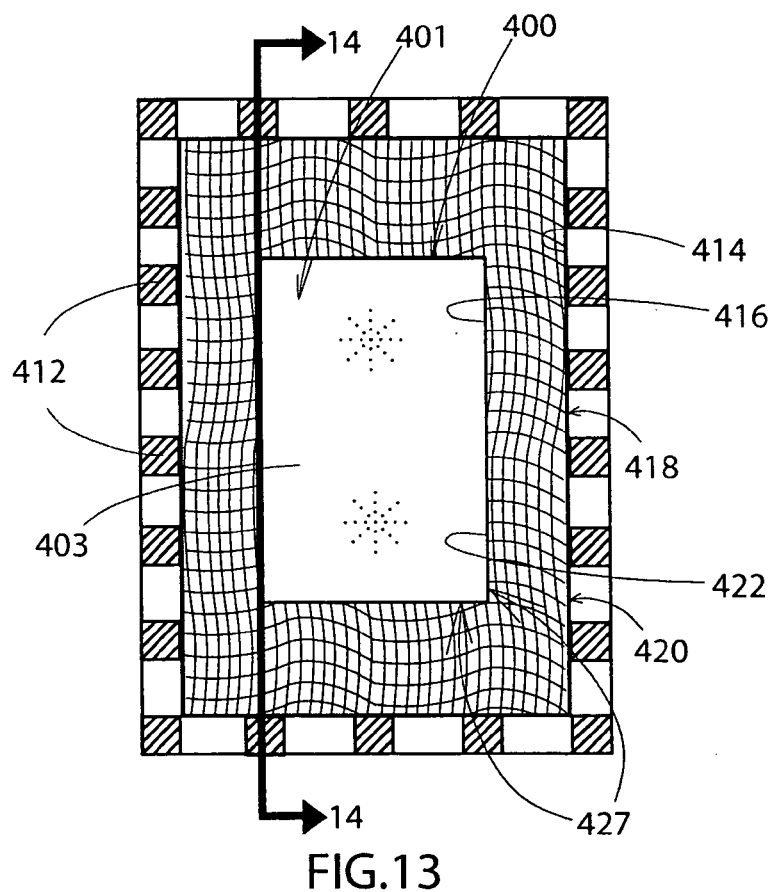
FIG. 13 is a sectional view of a third embodiment of the present invention through the side rails of a crib as viewed from above with the crib mattress removed to show the rocking assembly disposed in the opening of a peripheral member which in combination with the rocking assembly supports the crib mattress.

A first embodiment of the infant sleep-inducing apparatus or rocking assembly of the present invention is indicated generally at 100 in FIGS. 1-2; a second embodiment is indicated generally at 300 in FIGS. 11-12; and a third embodiment is indicated generally at 400 in FIGS. 13-14. Referring to FIG. 1, rocking assembly 100 includes a base 102 and a top member 104 which is pivotally mounted (Arrows A) on base 102 at a pivot 106. Base 102 is seated on a supporting surface 98 and an infant or child supporting structure in the form of a car seat 108 is seated on top member 104. Car seat 108 is substantially stationary with respect to top member 104 so that car seat 108 is pivotally moveable with top member 104 relative to base 102. Base 102 and top member 104 are formed of rigid materials. One preferred material is a rugged and durable plastic although other rigid materials may be utilized as well.

With reference to FIG. 2, assembly 100 further includes an intermediate movable member in the form of a rollable truck 110 and a drive assembly 112 for moving truck 110 cyclically back and forth as detailed further below. Assembly 100 further includes an electronic control unit (ECU) 114 which includes a printed circuit board (PCB) and a central processing unit (CPU).

With continued reference to FIG. 2, base 102 includes a substantially flat bottom wall 116. First and second opposed end walls 118A and 118B are connected to and extend upwardly from bottom wall 116 and are elongated in an axial direction of base 102 and assembly 100. Base 102 further includes first and second opposed side walls 120A and 120B which extend upwardly from bottom wall 116 and are elongated from first end wall 118A to second end wall 118B in a longitudinal direction of base 102 and assembly 100. Together, bottom wall 116, end walls 118 and side walls 120 define therebetween an upwardly opening interior chamber 121. Pivot 106 includes first and second coaxial pivots 106A and 106B which respectively extend outwardly from side walls 120A and 120B and are centrally located intermediate end walls 118A and 118B. A pivot axis B passes through pivots 106A and 106B and extends in the axial direction.

First and second tracks 122A and 122B extend upwardly a short distance from bottom wall 116 and are elongated in the longitudinal direction from first end wall 118A to second end wall 118B. More particularly, first track 122A is spaced axially inwardly from and adjacent first side wall 120A and extends substantially parallel thereto and second track 122B is likewise spaced axially inwardly from and adjacent side wall 120B and extends substantially parallel thereto. First track 122A includes a pair of spaced rails 124A and 124B which are disposed adjacent one another and second track 122B likewise includes a pair of spaced rails 124C and 124D which are adjacent one another. Each of rails 124 has a substantially flat upper surface. A centrally located motor mount 126 includes a perimeter wall 128 extending upwardly from bottom wall 116 of base 102. Perimeter wall 128 defines an opening 130 which opens towards first end wall 118A. A plurality of mounting projections 132 extend upwardly from bottom wall 116 around perimeter wall 128 for mounting ECU 114 thereon with a respective plurality of fasteners (not shown).

With continued reference to FIG. 2, top member 104 includes a substantially flat top wall 134 having a substantially flat upper surface and second opposed end walls 136A and 136B extend downwardly from top wall 134 and are elongated in the axial direction. Top member 104 further includes first and second opposed side walls 138A and 138B which extend downwardly from top wall 134 and are elongated in the longitudinal direction from first end wall 136A to second end wall 136B. Together, top wall 134, end walls 136 and side walls 138 define therebetween a downwardly opening interior chamber 140. Each of side walls 138A and B defines a pivot hole 142 (only one shown) for receiving a respective one of pivots 106 of base 102.

Top wall 134 defines a pair of downwardly extending arcuate depressions 144 for receiving respective bottom portions of car seat 108. More particularly, depressions 144 are disposed respectively adjacent side walls 138A and 138B and are elongated in a longitudinal direction. Similar types of depressions or other mounting structures may be configured for mounting a car seat or other infant structure on top member 104. Depressions 144 or similar depressions are typically complementary to the respective bottom portions of the car seat or other infant support structure to be seated atop top member 104. Optionally a securing mechanism 146 may be included for securing car seat 108 to top member 104. Securing mechanism 146 is shown in FIG. 2 in dashed lines and is represented here as straps 148 and buckle members 150. Other securing mechanisms will be evident to one skilled in the art. Top wall 134 further defines first and second sets 152A and 152B of speaker holes. First and second speakers 154A and 154B are mounted on top wall 134 within interior chamber 140 respectively below sets 152A and 152B of speaker holes.

With continued reference to FIG. 2, truck 110 includes a rigid frame 156 on which are rotatably mounted a plurality of lower rollers and a plurality of upper rollers as further detailed below. Frame 156 is typically formed of a rugged and durable plastic although suitable materials may be used. Frame 156 includes first and second spaced side extensions 158A and 158B which are elongated in the longitudinal direction. Frame 156 further includes first and second end extensions or cross members 160A and 160B which are spaced from one another and are elongated in the axial direction. Cross members 160A and 160B each extend between and are connected to side extensions 158A and 158B so that cross members 160 and side extensions 158 define therebetween a central opening 162 of frame 156. Side extensions 158A and 158B include respective first lower roller mounts 164A and 164B in the form of downwardly opening roller housings within which a pair of first lower rollers 166A and 166B are rotatably mounted in a coaxial fashion. First lower rollers 166 are disposed adjacent first cross member 160A adjacent a first end of truck 110. Side extensions 158A and 158B also include a pair of spaced first lower roller mounts 168A and 168B in the form of downwardly opening housings in which a pair of second lower rollers 170A and 170B (FIG. 4) are respectively rotatably mounted in a coaxial manner. Second lower rollers 170 are spaced from first lower rollers 166 and are disposed adjacent second cross member 160B adjacent a second end of truck 110 opposite the first end.

A pair of first upper roller mounts 172A and 172B are spaced from one another and extend upwardly from cross member 160A respectively adjacent first and second side extensions 158A and 158B. Each first upper roller mount 172 includes a pair of spaced projections extending upwardly from cross member 160A with a respective first upper roller 174A and 174B rotatably mounted between said pair of projections such that each roller 174 is coaxial with the other. A pair of second upper roller mounts 176A and 176B extend upwardly from second cross member 160B respectively adjacent first and second side extensions 158A and 158B. Second upper roller mounts 176 each include a pair of upwardly extending projections with a respective second upper roller 178A and 178B disposed therebetween and rotatably mounted thereon in a coaxial manner. Upper rollers 174A and B are respectively disposed axially inwardly of lower rollers 166A and 170A and upper rollers 178A and 178B are likewise respectively disposed axially inwardly of lower rollers 166B and 170B so that first upper rollers 174 and second upper rollers 178 are aligned to engage camming surfaces of top member 104 (detailed below) and avoid engagement with depressions 144 of top member 104. First cross member 160A further includes an internally threaded boss 180 which is disposed centrally between first and second side extensions 158A and 158B.

With continued reference to FIG. 2, drive assembly 112 further includes an electric stepper motor 182 disposed in central opening 162 and a jack screw or externally threaded rod 184 which extends outwardly from motor 182 and threadably engages boss 180. Stepper motor 182 is operable in forward and reverse directions to rotate rod 184 in either direction as indicated at Arrow C to cause the longitudinal linear movement of truck 110 in the opposite directions indicated by Arrow D. Stepper motor 182 by its very nature is capable of rotating in small, discrete steps to produce an output in small, discrete steps whereby motor 182 provides precise control of the movement of truck 110. Stepper motor 182 is thus capable of producing a smooth oscillating movement of truck 110 if desired. In addition, stepper motor 182 importantly is able to quickly change directions or stop virtually instantaneously at any desired time in order to provide an interrupted or jerky type of movement as well. Also, stepper motor 182 may be controlled in order to increase or decrease its speed and thus the speed of the movement of truck 110 and top member 104. Thus, stepper motor 182 is capable of providing to truck 110 and top member 104 an infinite variety of movement patterns which is important in the synchronization of the movement of top member 104 via truck 110 and production of music or other sounds via speakers 154, which will be discussed in more detail further below. As an example of their precision control, stepper motors are commonly used to control the positioning of printer heads in modern printers.

Figure 3:
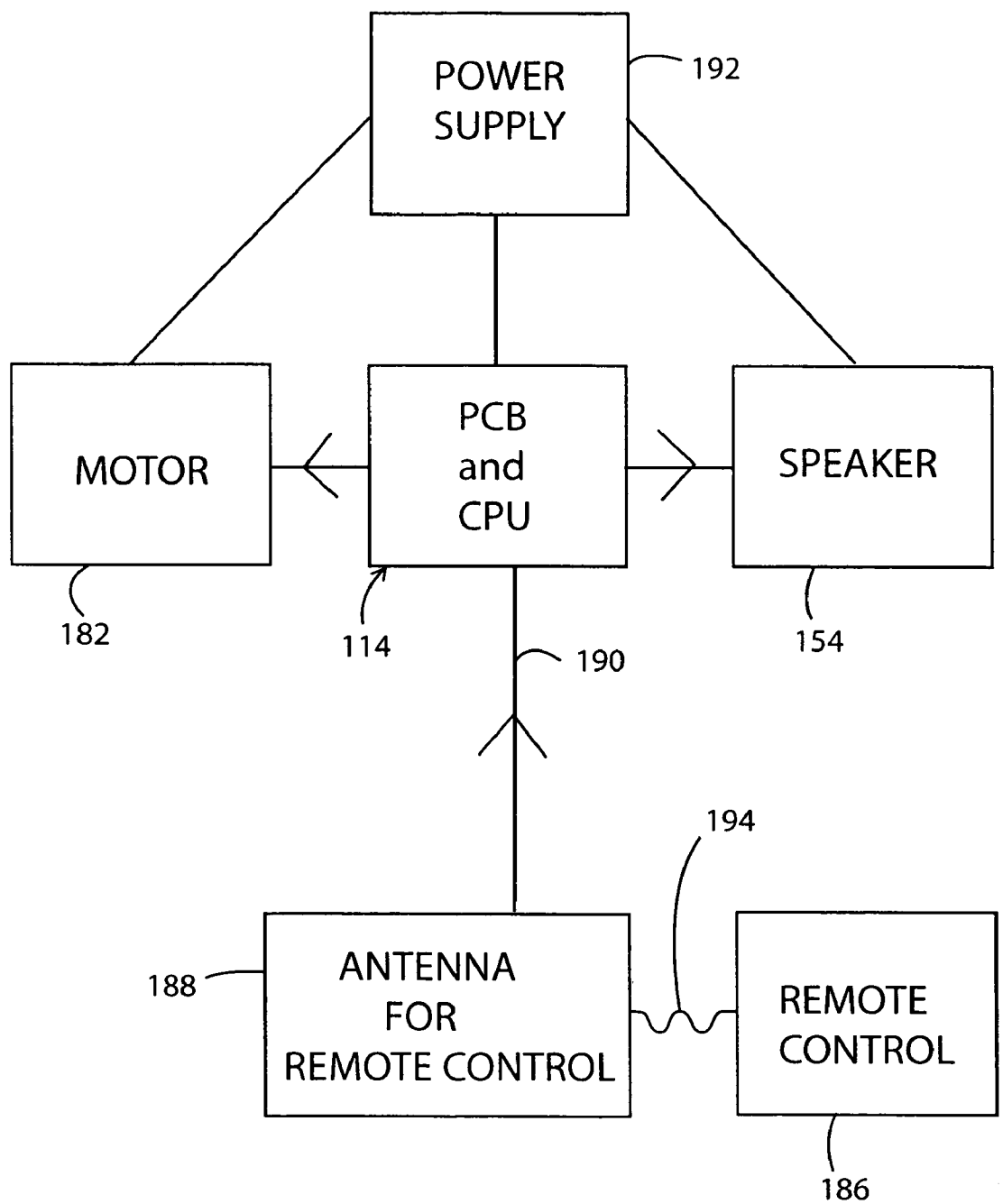
FIG. 3 is a diagrammatic view related to remotely controlling the rocking assembly of the first embodiment.

With reference to FIG. 3, rocking assembly 100 may be conveniently controlled via a remote control 186. An antenna 188 is mounted on or adjacent ECU 114 and is in electrical communication therewith as indicated by electrical circuit 190. Motor 182, ECU 114 and speakers 154 are powered by an electrical power supply 192 in any suitable electrical configuration, such as respective electrical circuits represented by the respective lines extending from the power supply to said powered elements. When connected to power supply 192, assembly 100 is ready to be controlled by remote control 186 via a wireless signal 194 such as an RF signal or other wireless signals known in the art. Signal 194 is received by antenna 188 whereby the signal is communicated to ECU 114 so that the CPU of ECU 114 controls motor 182 and speakers 154 as desired, as will be further detailed below.

Figure 4:
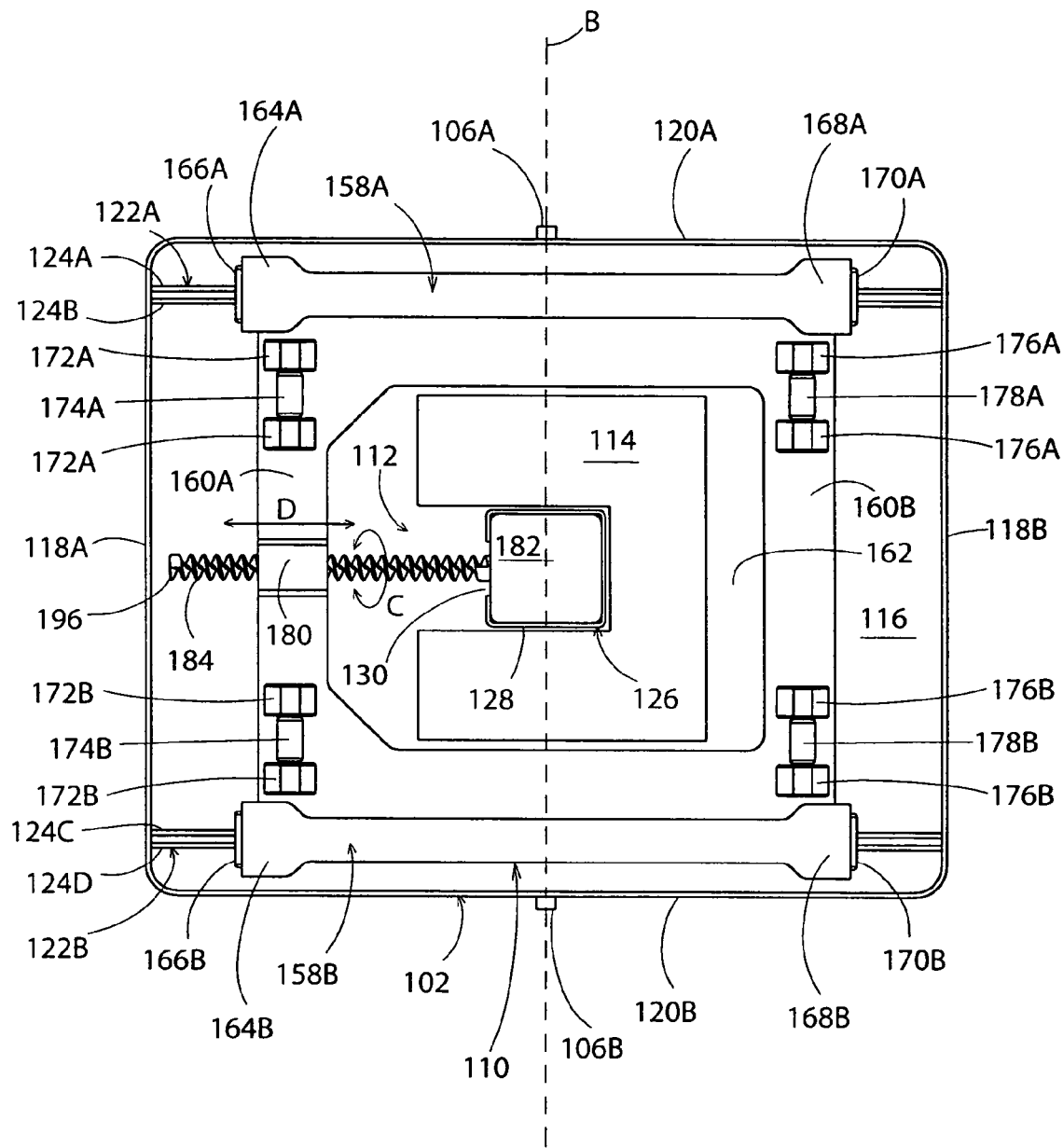
FIG. 4 is a top view of the first embodiment with the top member removed.

With reference to FIG. 4, the relationship of base 102, truck 110, drive assembly 112 and ECU 114 is described in part. Truck 110 is rollably mounted on base 102 so that truck 110 is rollable back-and-forth in the longitudinal direction as indicated by Arrows D. More particularly, lower rollers 166A and 170A rollingly engage track 122A and lower rollers 166B and 170B rollingly engage track 122B. Thus, rollers 166A and 170A along with the portion of first side extension 158A extending therebetween is disposed directly above track 122A. Likewise, rollers 166B and 170B and the portion of second side extension 158A extending therebetween is disposed directly above track 122B. Stepper motor 182 is disposed within perimeter wall 128 with a portion of threaded rod 184 extending through opening 130 of wall 128. Rod 184 extends toward first end wall 118A of base 102 and has a free end 196 which is disposed adjacent wall 118A. FIG. 4 represents a home or resting position of truck 110 wherein truck 110 is substantially equidistant from end walls 118A and 118B. This home or resting position is also represented in FIGS. 5-7.

Figure 5:
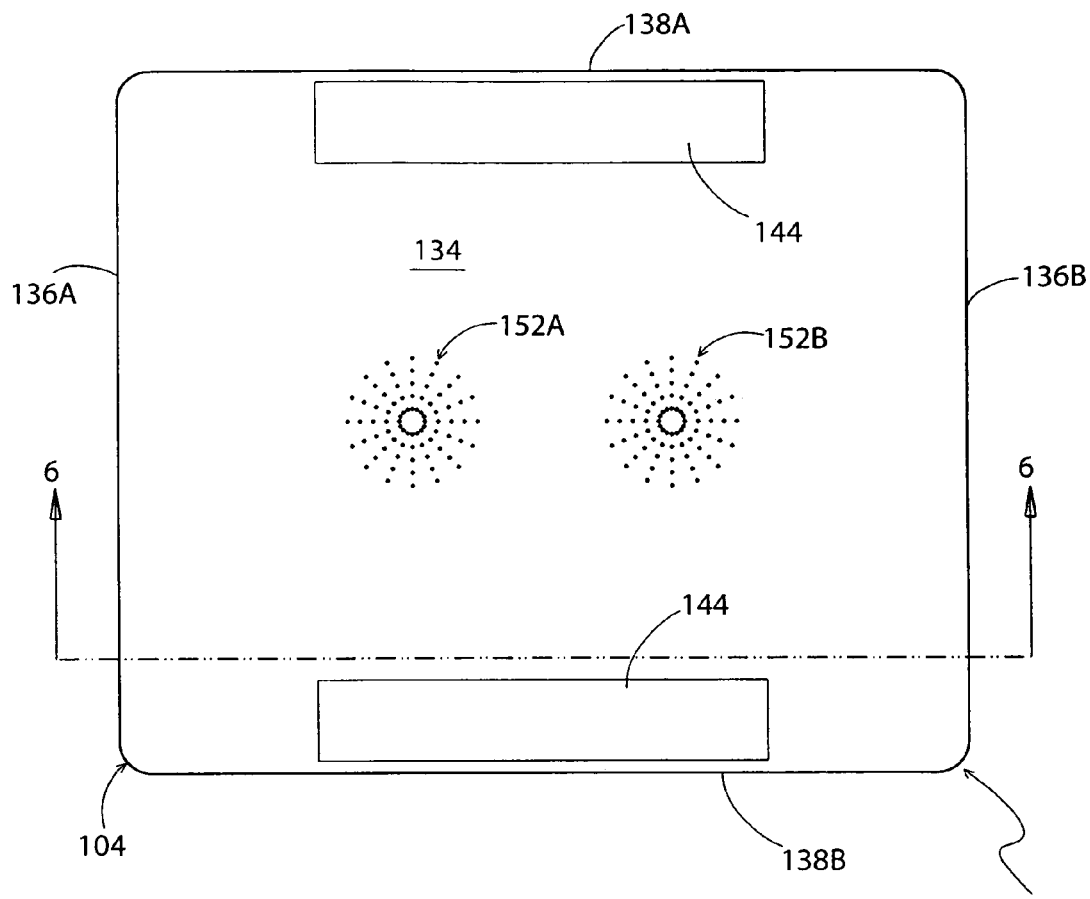
FIG. 5 is a top view of the first embodiment when fully assembled.

FIG. 5 shows the top view of assembly 100 when top member 104 is mounted on base 102. As this top view shows, no portion of base 102, truck 110, drive assembly 112 or ECU 114 is visible from above because top member 104 completely covers them. To that effect, FIG. 6 shows end walls 136A and 136B of top member 104 disposed outwardly of end walls 118A and 118B of base 102. In the home or resting position of top member 104, end walls 136A and 136B respectively vertically overlap end walls 118A and 118B of base 102. While threaded rod 184 has been removed in FIG. 6 for clarity, rod 184 is substantially disposed in interior chamber 121 of base 102 when assembled. ECU 114 is mounted on projections 132 within interior chamber 121 while stepper motor 182 is disposed primarily in interior chamber 121 although it may extend above the top of base 102. FIG. 6 shows rollers 166A and 178A seated atop first track 122A primarily within interior chamber 121 with upper rollers 174B and 178B disposed above the top of base 102. More particularly, lower rollers 166A and 178A contact first track 122A at respective home positions HP1 and HP2 which are associated with the home or resting position of truck 110.

Figure 6:
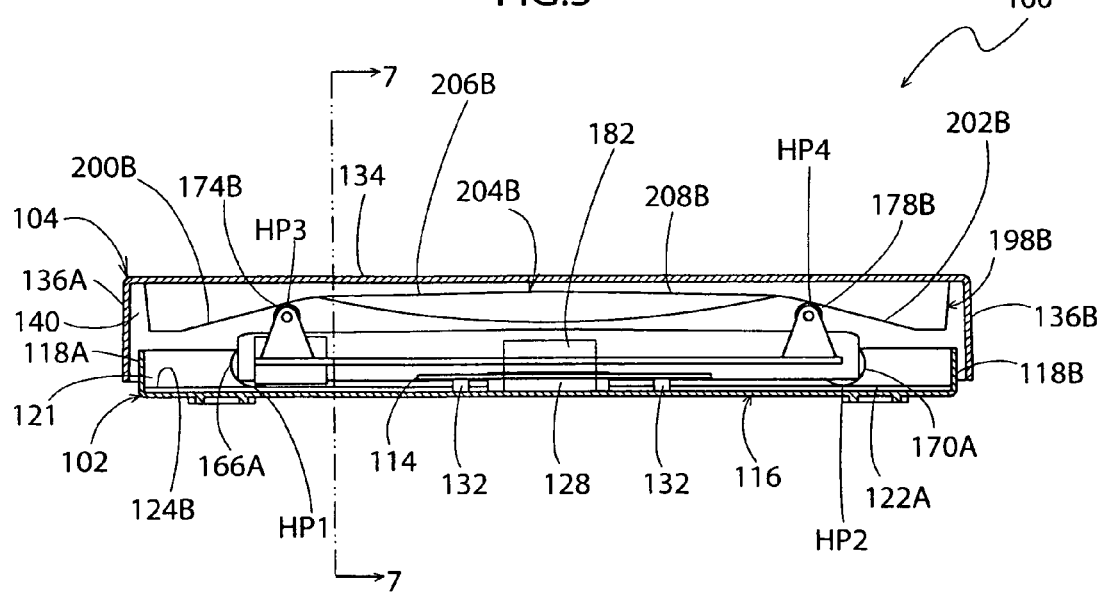
FIG. 6 is a sectional view taken on line 6-6 of FIG. 5.
Figure 7:
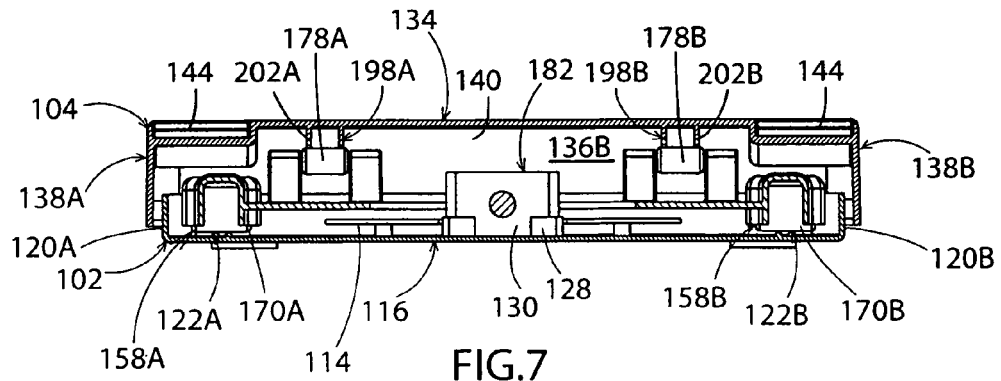
FIG. 7 is a sectional view taken on line 7-7 of FIG. 6.

With reference to FIGS. 6 and 7, top member 104 includes first and second spaced ramps 198A and 198B which extend downwardly from top wall 134 into interior chamber 140. Ramps 198A and 198B include respective first tapered camming surfaces 200A and 200B and second tapered camming surfaces 202A and 202B. Camming surfaces 200 are disposed adjacent first end wall 136A and second camming surfaces 202 are disposed adjacent second end wall 136B. More particularly, first camming surfaces 200 taper downwardly and outwardly in the longitudinal direction toward first end wall 136A and second camming surfaces 202 taper downwardly and outwardly in the longitudinal direction toward second end wall 136B. Ramps 198A and 198B further include central portions 204A and 204B which are relatively flat and generally horizontal. Central portions 204A and B extend between and are in communication with the respective first and second camming surfaces of the respective ramp. Although central portions 204 are relatively flat, the exemplary embodiment shows that central portions 204A and 204B include first lesser tapered surfaces 206A and 206B and second lesser tapered surfaces 208A and 208B. Each first lesser tapered surface 206 tapers outwardly and downwardly from a center point of a respective ramp 198 to a respective one of first tapered camming surfaces 200 while each second lesser tapered surface tapers outwardly and downwardly from the central point of the respective ramp to a respective one of second tapered camming surfaces 202. As shown in FIG. 6, first upper roller 174B contacts first tapered camming surface 200B at a home position HP3 and second upper roller 178B contacts second tapered camming surface 202B at a home position HP4.

Figure 8:
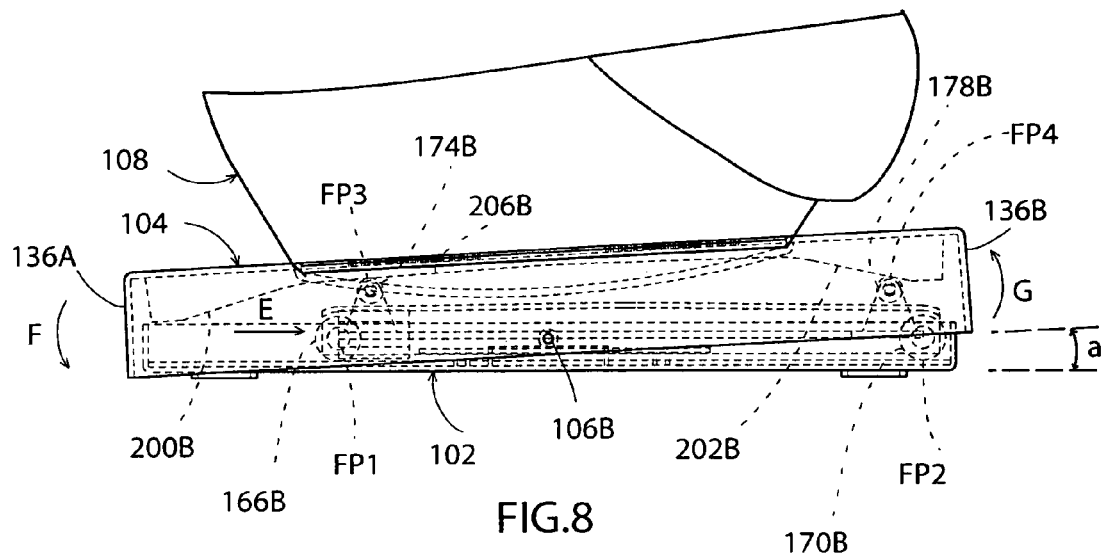
FIG. 8 is a side elevational view of the first embodiment with the top member rotated relative to the base so that the end of the top member to the right of the figure is rotated upwardly and the end to the left of the figure is rotated downwardly in response to the movement of the truck toward the right of the figure.

The operation of assembly 100 is described with reference to FIGS. 8-10. In response to the rotation of stepper motor 182 and rod 196 in a first or forward direction (FIG. 4), truck 110 moves in a first or forward direction as indicated at Arrow E in FIG. 8 to begin a cyclical movement of truck 110, which is more particularly an oscillating movement. More particularly, truck 110 rolls on base 102 and is shown in FIG. 8 at a forwardmost position with lower roller 166B at a forwardmost position FP1 and lower roller 170B at a forwardmost position FP2. FIG. 8 also represents a first direction-reversing position of truck 110 at which truck 110 typically stops only in order to move back in the other direction in continuing the oscillating movement thereof. FIG. 8 also shows a forwardmost position FP3 of upper roller 174B and a forwardmost position FP4 of upper roller 178B. The forward movement of truck 110 has caused upper roller 174B to roll from the home position (FIG. 6) engagement with first tapered camming surface 200B to a position engaging first lesser tapered surface 206B. Simultaneously, upper roller 178B has moved from the home position HP4 (FIG. 6) rollingly along second tapered camming surface 202B toward end wall 136B. The movement of upper rollers 174 and 178 along these respective camming surfaces causes top member 102 to rotate in a first or forward direction about pivot 106 so that first end wall 136A rotates downwardly as indicated at Arrow F and second end wall 136B rotates upwardly as indicated at Arrow G. Thus, top member 102 has rotated in a forward direction to a forwardmost or first direction-reversing position. The degree of rotation of top member 102 from the home position (FIG. 6) to the forwardmost position is represented at Angle a in FIG. 8. Angle a is typically on the order of approximately 3° although this may vary somewhat.

Figure 9:
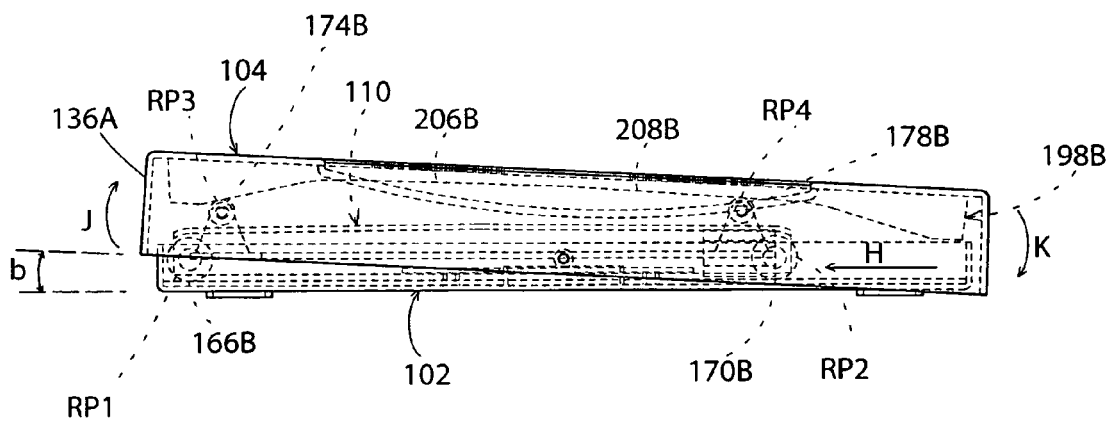
FIG. 9 is similar to FIG. 8 and shows the left end of the top member rotated upwardly and the right end of the top member rotated downwardly in response to movement of the truck to the left.

To continue the linear oscillation of truck 110 and the pivotal oscillation of top member 102, motor 182 is rotated in a reverse direction (FIG. 4) to roll truck 110 linearly in the reverse direction thereof as indicated at Arrow H in FIG. 9 to effect the reverse rotational movement of top member 102 about pivot 106 with first end wall 136A rotating upwardly as shown at Arrow J and second end wall 136B rotating downwardly as indicated at Arrow K. The reverse movement of motor 182, rod 196, truck 110 and top member 102 moves truck 110 and top member 102 from the forwardmost position of FIG. 8 to the rearwardmost position of truck 110 and top member 102 shown in FIG. 9. More particularly, FIG. 9 shows lower rollers 166B and 170B respectively in their most rearward positions RP1 and RP2 while upper rollers 174B and 178B are shown in their most rearward positions RP3 and RP4. Upper roller 174B has thus moved from engagement with lesser tapered surface 206B at forward position FP3 in FIG. 8 to engagement with tapered camming surface 200B at rearmost position RP3 in FIG. 9 while rollingly engaging camming surfaces 206B and 200B along the way. Simultaneously, upper roller 178B has moved from the forward position FP4 of FIG. 8 to the rearward position RP4 of FIG. 9 in which roller 178B engages lesser tapered surface 208B. The linear movement of truck 110 in the reverse direction indicated at Arrow H has thus caused the rotational movement of top member 102 as a result of the camming engagement between upper rollers 174B and 178B with ramp 198B. In the fully reversed or most rearward positions of truck 110 and top member 102 shown in FIG. 9, top member 102 has rotated to a degree shown in Angle b with respect to the home position. Angle b is typically the same as Angle a although this may vary.

To continue the oscillating movement of truck 110 and top member 102, stepper motor 182 and rod 196 would be rotated in the forward direction again to move truck 110 and top member 102 back to the forwardmost position shown in FIG. 8. One cycle of the oscillating movement of truck 110 is the movement of truck 110 to the position shown in FIG. 8 to the position shown in FIG. 9 and then back to the position shown in FIG. 8. Likewise, one oscillation cycle for top member 102 is the movement of top member 102 from the position shown in FIG. 8 to that shown in FIG. 9 and back to that shown in FIG. 8 again. The oscillation cycles just described with regard to truck 110 and top member 102 are defined herein as a maximum oscillation cycle because truck 110 and top member 102 travel the greatest pathway possible for the configuration of assembly 100. One advantage of the use of stepper motor 182 is the ability to create a variety of less-than-maximum oscillation cycles wherein truck 110 and top member 102 travel a less-than-maximum pathway, simply meaning that truck 110 and top member 102 would not travel the full distance to at least one of their forwardmost and rearmost positions respectively shown in FIGS. 8 and 9. Such less-than-maximum cycles can have an infinite variety. For example, top member 102 may move from the home position shown in FIG. 6 to the forwardmost position shown in FIG. 7 and back to the home position shown in FIG. 6 wherein the corresponding oscillation cycle of top member 102 would not include rotation beyond the home position toward the rearmost position of FIG. 9. Alternately, a less-than-maximum oscillation cycle may include rotation from the home position of FIG. 6 part way to the forwardmost position in FIG. 8 and back to the home position and beyond to a rearward position part of the way to the rearmost position of FIG. 9 to be completed by a return to the home position of FIG. 6.

The ability to create less-than-maximum oscillation cycles as described relates to the ability of stepper motor 182 to stop its rotation at virtually any point. In addition, stepper motor 182 can reverse its rotation at virtually any point in order to change the direction of the oscillating movement. This ability also allows for one of the key features of the invention wherein the movement of top member 102 is synchronized with an associated sound produced by speakers 152. Thus, for instance, while top member 102 may be oscillated in a smooth or continuous manner, stepper motor 182 may also interrupt the continuous movement of top member 102 for any length of time desired. Typically, this would only be for a very brief period in order to produce, for example, a movement having the effect of a jerking motion or a rumbling motion. Such a jerking motion or rumbling type motion may thus be synchronized with various sounds or sound patterns produced by speakers 152 in order to create a more real sensation for the infant seated in car seat 108 or another infant support structure.

One example of this type of scenario is the playing of a sound track which simulates the sound of a car traveling down the road to include the sounds produced when the car travels over bumps or dips in the road. Stepper motor 182 can be controlled to produce a generally oscillating movement while also creating a short stop or reverse motion of top member 102 during this generally oscillating movement to simulate such a bump in the road and more particularly to create this effect simultaneously with the sound of the bump on the sound track. Similarly, speakers 152 may produce a sound and top member 102 may simulate a synchronized movement which simulates a train moving along train tracks and the associated sound of the wheels interacting with the joints of the train tracks. Another example is to simulate the sound and motion of waves crashing on a sea shore. Similarly, the sound of a heart beat or various sounds that are typically heard by the infant in utero may be simulated. Likewise, musical tracks may be utilized with corresponding movements of top member 102 which move rhythmically with the rhythm of the music and the like.

Figure 10:
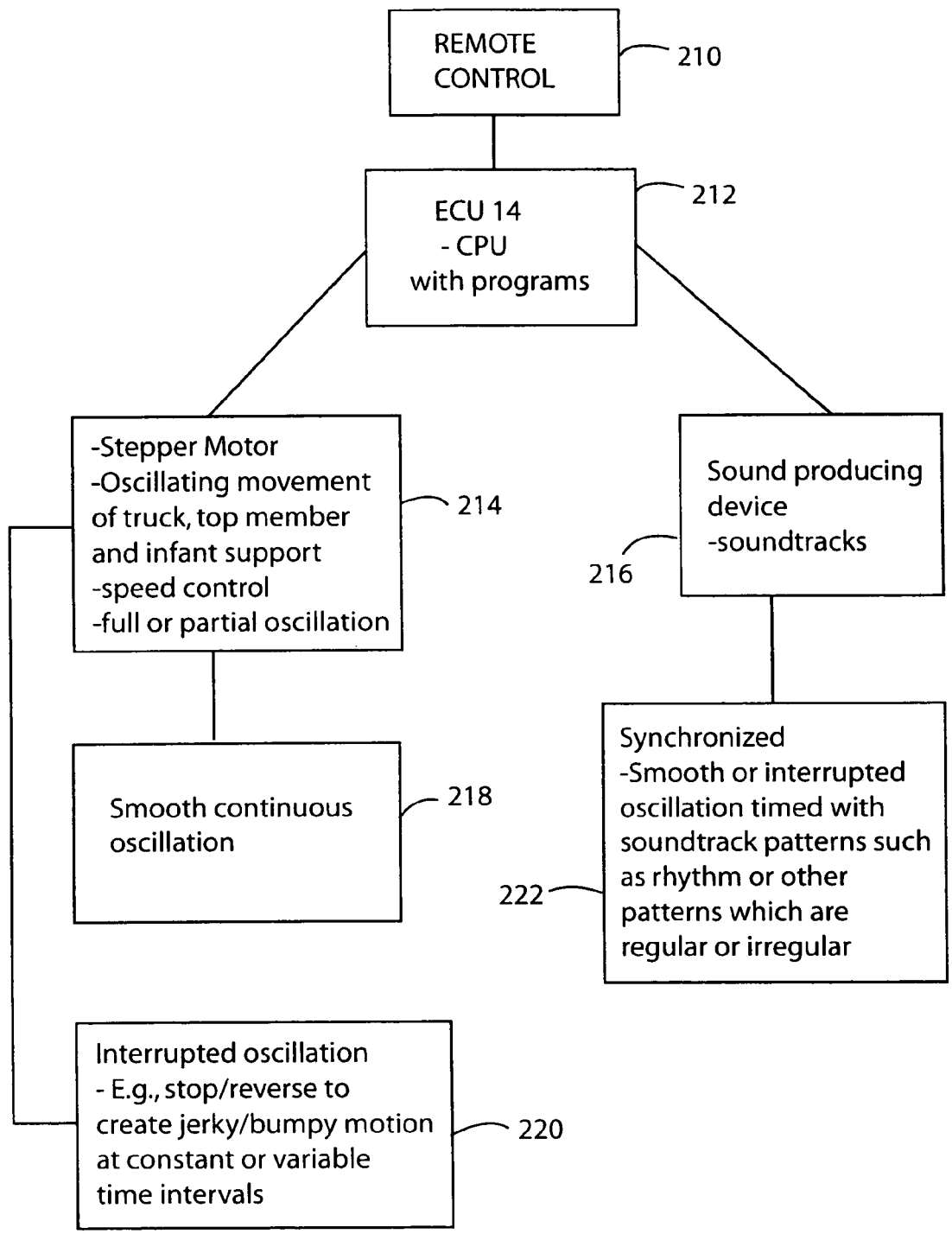
FIG. 10 is a flow chart showing various control options for the movement provided by the rocking assembly of the first embodiment and the use of sound production associated therewith.

Thus, with reference to FIG. 10, rocking assembly 100 provides an apparatus wherein a remote control, as indicated at block 210 of FIG. 10 may be used to control these various movements and the synchronization of the movements and associated sounds. The use of a remote control is very convenient in that once a car carrier seat or the like is placed on rocking assembly 100, no further handling is required in order to put assembly 100 into operation. In addition, a remote control may be kept away from older children in order to prevent their tampering with controls. More particularly, the remote control may be operated as at block 210 to control the ECU (block 212) in order to operate assembly 100. As previously noted, ECU 114 includes a CPU which is in the form of a microprocessor. The CPU preferably includes a plurality of programs which are configured to control stepper motor 182 and a sound producing device such as speakers 152 as at blocks 214 and 216 so that assembly 100 produces an automated and typically repetitive sound track and set of commands to control the stepper motor to produce the desired oscillating and other movement of the truck, the top member and the infant support. It is noted that the various programs may be configured to produce the oscillating and other movements via the stepper motor with or without the production of associated sounds. As also shown in block 214, the speed of the stepper motor may be varied in order to control the speed of the oscillating or other movements of the truck, top member and infant support. In addition, as previously discussed, the oscillating movement may involve either a maximum or less-than-maximum oscillation cycle. The oscillating movement could be a smooth and continuous oscillation as at block 218 wherein top member 102 moves in a smooth continuous manner except for the normal brief stopping motions at the direction reversing positions thereof. The stepper motor may also produce an interrupted oscillation as indicated at block 220 in which the movement of top member 102 is stopped and/or reversed to create a jerky, bumpy or rumbling type of motion typically to simulate various movements as previously discussed. This can be accomplished at constant or variable time intervals. In short, the possibilities are virtually endless in terms of the movement patterns that may be arranged.

As previously noted, the CPU may run a program or programs to produce various sound tracks which may be used with any of the various movements of top member 102 previously discussed. This may or may not include synchronization of the sounds and movements of top member 102. As indicated at block 222, the sound tracks may produce various patterns with which the movement of top member 102 may be synchronized whether top member 102 moves in a smooth or interrupted oscillating movement. Thus, the sound track patterns may include regular or irregular rhythms or other patterns.

With reference to FIGS. 11 and 12, rocking assembly 300 is described. Assembly 300 is similar to assembly 100 except that it is configured for mounting a stroller 302 thereon. Stroller 302 includes a frame 303 having front wheels 304 and rear wheels 306 (only one shown) mounted thereon. Assembly 300 includes a top member 308 and a plurality of wheel mounts 310 mounted thereon. More particularly, there are four wheel mounts 310 which extend outwardly from top member 308 adjacent respective corners thereof. Each wheel mount 310 includes a bottom wall 312 with a plurality of side walls 314 extending upwardly therefrom to define therebetween an upwardly opening cavity 316 in which one of wheels 304 and 306 is received to mount stroller 302 on top member 308 of assembly 300. Top member 308 is formed without depressions such as depressions 144 of assembly 100 for mounting thereon the car carrier seat. However, assembly 300 may include such depressions in order to be usable with a carrier seat and a stroller. In other respects, assembly 300 is the same in configuration and operation as assembly 100.

With reference to FIGS. 13 and 14, rocking assembly 400 is described. Assembly 400 is the same as assembly 100 except it has a top member 401 which is free of depressions 144. Thus, top member 401 has an upper surface 403 the entirety of which is substantially flat other than the speaker holes formed therein. Rocking assembly 400 is adapted for use with an infant support structure in the form of a crib 402 and a crib mattress 404. It is noted that assembly 100 having depressions 144 in top member 104 is also suitable for this purpose. Crib 402 is shown as a standard crib having a frame 406 which includes a horizontal mattress-supporting floor 408 supported in an elevated fashion by a plurality of legs 410. Frame 406 further includes a plurality of uprights or side rails 412 which are spaced from one another and form along with elevated floor 408 a generally rectangular enclosure 414 in which mattress 404 is disposed. In a typical crib configuration, mattress 404 would be seated directly atop floor 408. However, rocking assembly 400 is adapted to sit on floor 408 with mattress 404 thereabove. More particularly, assembly 400 is disposed atop floor 408 centrally within enclosure 414 within an opening 416 defined by a mattress support member in the form of peripheral member 418, which is also seated on floor 408. As viewed from above, peripheral member 418 has a substantially rectangular outer perimeter 420 which is about the same as the outer perimeter of a standard crib mattress such as mattress 404. Opening 416 of peripheral member 418 is bounded by a substantially rectangular inner perimeter 422 sized to abut or fit closely adjacent an outer perimeter 427 of assembly 400 typically formed by side walls and end walls of top member 401. As shown in FIG. 14, peripheral member 418 has an upper surface 423 and a lower surface 425 defining therebetween a thickness or height H1 which is substantially the same as the height of assembly 400. More particularly, the respective upper surfaces 403 and 423 of the top member of assembly 400 and mattress support member 418 are disposed substantially at the same height. Advantageously, height H1 is typically on the range of about 1.5 inches. Thus, assembly 400 maintains a relatively low profile which is useful with crib 402 so that assembly 400 and peripheral member 418 do not raise mattress 404 to an undesirable height. Rocking assemblies 100 and 300 also maintain a similarly low profile. Typically, peripheral member 418 is formed of a slab of foam or other flexible material which is suitable for supporting any portion of mattress 404 not supported by assembly 400. However, a peripheral member formed of a rigid material is also contemplated.

The operation of assembly 400 is the same as the operation of assemblies 100 and 300 except that assembly 400 is utilized to provide a rocking motion to mattress 404 or a portion thereof.

Thus, rocking assemblies 100, 300 and 400 provide a convenient assembly for facilitating the pacification and/or sleep of an infant or young child. This is accomplished by a low profile structure which provides a rocking motion which may be synchronized with associated sounds as previously discussed. Alternately, the rocking assemblies of the present invention may be used without sound to provide complex movement provided by the stepper motor driving the top member of the assembly. The rollable truck also provides a convenient configuration for moving the top member via respective camming surfaces. It will be appreciated by those skilled in the art that a variety of changes may be made which are within the scope of the present invention. For example, the ability to synchronize the various movements of the top member with associated sounds may be accomplished with a variety of rocking mechanisms. Preferably, this involves the use of the stepper motor although there may be other configurations which may accomplish this as well. The stepper motor offers clear advantages and the ability to control the movement of the top member and produce complex movements thereof. The stepper motor as shown in the exemplary embodiment provides rotational output directly to the threaded rod in order to threadably engage the truck to produce linear movement of the truck. However, stepper motors may also be configured to produce a linear output. For instance, a translating rod may be connected to the stepper motor and moved in an extending and retracting motion in order to move a truck similar to truck 110 if desired to produce stepped movement of the truck. It is further contemplated that a stepper motor may be utilized without a rollable truck in order to directly or indirectly move a top member in a desired manner to produce a rocking motion. While the rocking motion typically involves movement of the top member along at least two axes, a rocking assembly may be configured to provide a simple linear oscillating movement of a top member if so desired. In addition, a more complex rocking movement utilizing movement about three axes is possible although in general it is typically desirable to maintain a simple configuration in order to reduce production costs as well as minimize breakage and repair factors which are typically involved with more complex configurations and movements. Other changes will be evident to one skilled in the art.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. An infant sleep-inducing apparatus comprising:
a base adapted to sit on a supporting surface;
a sound-producing device for playing a soundtrack to produce a sound pattern;
a top member which is movably mounted on the base and adapted to support an infant-supporting structure;
a motor for moving the top member relative to the base in a manner which is synchronized with the sound pattern; and
first and second threaded members one of which is operatively connected to the top member and the other of which is rotatably driven by the motor; and
wherein one of the first and second threaded members defines an internally threaded hole; and
the other of the first and second threaded members defines an externally threaded screw which threadably engages the internally threaded hole to form a threaded engagement between the first and second threaded members by which the top member moves in response to rotation of the motor-driven threaded member.

2. The apparatus of claim 1 wherein the motor operates to rotate in forward and reverse directions to move the top member along a cyclical path.

3. The apparatus of claim 2 further comprising a central processing unit programmed to control rotation of the motor in the forward and reverse directions.

4. The apparatus of claim 1 further including an electronic control unit (ECU) for controlling the motor and the sound-producing device.

5. The apparatus of claim 4 wherein the ECU is programmed to provide a plurality of top member movement programs which differ from one another and which control movement of the top member via the motor.

6. The apparatus of claim 1 wherein the top member moves in an oscillating manner along an oscillation path which includes first and second direction-reversing positions; and further comprising a central processing unit programmed to momentarily stop rotation of the motor and resume rotation of the motor so that the top member momentarily stops along the oscillation path intermediate the first and second positions and resumes movement in the oscillating manner.

7. The apparatus of claim 6 wherein the top member moves in forward and reverse directions during travel from one of the first and second positions to the other of the first and second positions.

8. The apparatus of claim 1 wherein the motor is a stepper motor.

9. The apparatus of claim 8 further including a movable member which moves in response to movement of the stepper motor; and wherein the top member moves in response to movement of the movable member.

10. The apparatus of claim 9 wherein the movable member engages the top member at a camming surface to move the top member.

11. The apparatus of claim 8 further including an electronic control unit (ECU) for controlling the stepper motor and the sound-producing unit.

12. The apparatus of claim 11 wherein the ECU is programmed to provide a plurality of soundtracks which produce different sound patterns when played by the sound-producing device and a plurality of top member movement programs which are synchronized respectively with the different sound patterns.

13. The apparatus of claim 8 wherein the sound pattern produced during play of the soundtrack comprises a first sound associated with a jerking movement; and further comprising an electronic control unit in communication with the stepper motor and programmed to stop rotation of the stepper motor virtually instantaneously to provide a jerking movement to the top member simultaneous with the first sound.

14. The apparatus of claim 8 wherein the sound pattern produced during play of the soundtrack comprises a first sound associated with a jerking movement; and further comprising an electronic control unit in communication with the stepper motor and programmed to quickly reverse rotation of the stepper motor to provide a jerking movement to the top member simultaneous with the first sound.

15. The apparatus of claim 8 further comprising an electronic control unit in communication with the stepper motor and programmed to stop rotation of the stepper motor virtually instantaneously to provide a jerking movement to the top member.

16. The apparatus of claim 8 further comprising an electronic control unit in communication with the stepper motor and programmed to control the stepper motor to rotate in forward and reverse directions.

17. The apparatus of claim 16 wherein the electronic control unit is programmed to quickly reverse rotation of the stepper motor to provide a jerking movement to the top member.

18. The apparatus of claim 8 wherein the stepper motor is configured to stop its rotation virtually instantaneously at virtually any point.

19. The apparatus of claim 18 wherein the stepper motor is configured to reverse its rotation virtually instantaneously at virtually any point.

20. The apparatus of claim 1 further including an electronically stored movement control program for controlling movement of the top member.

21. The apparatus of claim 1 further including a movable member which is disposed between the base and the top member and which moves in response to movement of the motor; and wherein the top member moves in response to movement of the movable member.

22. The apparatus of claim 21 wherein the movable member moves in response to rotation of the driven threaded member.

23. The apparatus of claim 1 wherein at least one wheel-receiving structure is mounted on the top member and adapted to receive a wheel of an infant-supporting structure.

24. The apparatus of claim 1 wherein the top member moves in a jerking manner.

25. The apparatus of claim 24 wherein the sound pattern produced during play of the soundtrack comprises a first sound associated with the jerking movement; and wherein the top member moves in the jerking manner simultaneously with the first sound.

26. An infant sleep-inducing apparatus comprising:
a base adapted to sit on a supporting surface;
a sound-producing device for playing a soundtrack to produce a sound pattern;
a top member which is movably mounted on the base and adapted to support an infant-supporting structure;
a motor for moving the top member relative to the base in a manner which is synchronized with the sound pattern;
a movable member which is disposed between the base and the top member and which moves in response to movement of the motor; and wherein the top member moves in response to movement of the movable member;
first and second surfaces on the top member which are spaced from one another; and first and second upper rollers which are rotatably mounted on the movable member and have respective circular outer perimeters which roll respectively along the first and second surfaces of the top member.

27. The apparatus of claim 26 further comprising third and fourth surfaces on the top member which are spaced from one another and from the first and second surfaces; and third and fourth upper rollers which are rotatably mounted on the movable member and have respective circular outer perimeters which roll respectively along the third and fourth surfaces of the top member.

28. An infant sleep-inducing apparatus comprising:
a base adapted to sit on a supporting surface;
a sound-producing device for playing a soundtrack to produce a sound pattern;
a top member which is movably mounted on the base and adapted to support an infant-supporting structure;
a motor for moving the top member relative to the base in a manner which is synchronized with the sound pattern;
a movable member which is disposed between the base and the top member and which moves in response to movement of the motor; and wherein the top member moves in response to movement of the movable member;
first and second surfaces on the base which are spaced from one another; and first and second lower rollers which are rotatably mounted on the movable member and have respective circular outer perimeters which roll respectively along the first and second surfaces of the base.

29. The apparatus of claim 28 further comprising first and second surfaces on the top member which are spaced from one another; and first and second upper rollers which are rotatably mounted on the movable member and have respective circular outer perimeters which roll respectively along the first and second surfaces of the top member.

30. The apparatus of claim 28 further comprising third and fourth surfaces on the base which are spaced from one another and from the first and second surfaces; and third and fourth lower rollers which are rotatably mounted on the movable member and have respective circular outer perimeters which roll respectively along the third and fourth surfaces of the top member.

31. An infant sleep-inducing apparatus comprising:
a base adapted to sit on a supporting surface;
a sound-producing device for playing a soundtrack to produce a sound pattern;
a top member which is movably mounted on the base and adapted to support an infant-supporting structure;
a motor for moving the top member relative to the base in a manner which is synchronized with the sound pattern;

wherein the apparatus has an outer perimeter; and the top member has an upper surface; and further including a mattress support member disposed laterally adjacent the outer perimeter of the apparatus and having an upper surface at substantially the same height as the upper surface of the top member whereby the upper surface of the mattress support member and the upper surface of the top member are each adapted to contact and support an infant mattress and the top member is adapted to move a portion of the mattress.

32. The apparatus of claim 31 further comprising an opening formed in the mattress support member; and wherein the apparatus is disposed within the opening.

33. An infant sleep-inducing apparatus comprising:
a base adapted to sit on a supporting surface;
a sound-producing device for playing a soundtrack to produce a sound pattern;
a top member which is movably mounted on the base and adapted to support an infant-supporting structure;
a motor for moving the top member relative to the base in a manner which is synchronized with the sound pattern;
a movable member which is disposed between the base and the top member and which moves in response to movement of the motor; and wherein the top member moves in response to movement of the movable member;
a first surface on the base; a second surface on the top member which extends transversely to the first surface; and first and second rollers rotatably mounted on the movable member and having respective circular outer perimeters which respectively roll along the first and second surfaces simultaneously during movement of the movable member to provide movement of the top member relative to the base.

34. The apparatus of claim 33 wherein the motor is a stepper motor.

35. The apparatus of claim 33 further comprising first and second threaded members one of which is operatively connected to the top member and the other of which is rotatably driven by the motor; and wherein one of the first and second threaded members defines an internally threaded hole; and the other of the first and second threaded members defines an externally threaded screw which threadably engages the internally threaded hole to form a threaded engagement between the first and second threaded members by which the top member moves in response to rotation of the motor-driven threaded member.

* * * * *